United States Patent
Chen et al.

(10) Patent No.: US 10,513,651 B2
(45) Date of Patent: Dec. 24, 2019

(54) SCREENING METHODS FOR ASPHALTENE STABILIZERS

(71) Applicant: BP Corporation North America Inc., Houston, TX (US)

(72) Inventors: Shuangshuang Chen, Bolingbrook, IL (US); Daniel Coy, Naperville, IL (US); Velu Subramani, Naperville, IL (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 15/354,029

(22) Filed: Nov. 17, 2016

(65) Prior Publication Data

US 2017/0152430 A1    Jun. 1, 2017

Related U.S. Application Data

(60) Provisional application No. 62/260,899, filed on Nov. 30, 2015.

(51) Int. Cl.
| | |
|---|---|
| C09K 8/524 | (2006.01) |
| F17D 1/16 | (2006.01) |
| C10G 75/04 | (2006.01) |
| C10G 21/30 | (2006.01) |
| C10G 21/00 | (2006.01) |

(52) U.S. Cl.
CPC ............ *C09K 8/524* (2013.01); *C10G 21/003* (2013.01); *C10G 21/30* (2013.01); *C10G 75/04* (2013.01); *F17D 1/16* (2013.01); *C10G 2300/206* (2013.01)

(58) Field of Classification Search
None
See application file for complete search history.

(56) References Cited

U.S. PATENT DOCUMENTS

| | | |
|---|---|---|
| 8,177,960 B2 | 5/2012 | Rouet et al. |
| 2004/0072361 A1 | 4/2004 | Varadaraj et al. |
| 2005/0091915 A1 | 5/2005 | Behler |
| 2011/0162558 A1 | 7/2011 | Mena Cervantes et al. |
| 2014/0130581 A1 | 5/2014 | Ovalles et al. |
| 2017/0058185 A1* | 3/2017 | Naumov ................ C09K 8/524 |

FOREIGN PATENT DOCUMENTS

EP    1 359 206    11/2003

OTHER PUBLICATIONS

Becker et al., "Asphaltene Deposition Control Using Chemical Control Agents," Annual Technical Conference, Jun. 7, 1992, pp. 70-1-70-6.

(Continued)

*Primary Examiner* — Jeffrey D Washville
(74) *Attorney, Agent, or Firm* — Kalim Fuzail

(57) ABSTRACT

A method for screening a candidate for efficacy as an asphaltene stabilizer comprises: forming a reconstituted oil by dispersing an asphaltene-containing solid in a hydrocarbon fluid; adding an asphaltene stabilizer candidate to the reconstituted oil to give an additized oil; and analyzing the stability of the asphaltenes in the additized oil. The method may be used to select a candidate for use as an asphaltene stabilizer during crude oil production, transportation or processing.

21 Claims, 2 Drawing Sheets

(56) References Cited

OTHER PUBLICATIONS

Cimino et al., "Thermodynamic Modelling for Prediction of Asphaltene Deposition in Live Oils," SPE 28993, Feb. 14, 1995, pp. 499-512.
Oskui et al., "Laboratory Technique for Screening Asphaltene Inhibitors for Kuwaiti Reservoirs," SPE 106361, May 21-23, 2006, pp. 1-9.
Akbarzadeh et al., "Asphaltenes—Problematic but Rich in Potential," Oilfield Review, vol. 19, No. 2, Jan. 6, 2007, pp. 22-42.
Hashmi et al., "Effect of Dispersant on Asphaltene Suspension Dynamics: Aggregation and Sedimentation," J. Phys. Chem. B, vol. 114, No. 48, Dec. 9, 2010, pp. 15780-15788.

\* cited by examiner

SCREENING METHODS FOR ASPHALTENE STABILIZERS

This application claims priority to U.S. Provisional Patent Application No. 62/260,899, filed Nov. 30, 2015, which is incorporated herein by reference.

FIELD OF THE INVENTION

The present invention relates to a method for screening a candidate for efficacy as an asphaltene stabilizer. In particular, the present invention relates to a method for screening a candidate for efficacy as an asphaltene stabilizer using a hydrocarbon fluid in which an asphaltene-containing solid, such as a pigged asphaltene deposit, has been dispersed.

BACKGROUND OF THE INVENTION

Asphaltenes are polar, polyaromatic macro-molecules that are present in crude oils, along with resins, aromatics and alkanes. Asphaltenes are typically present in crude oils in an amount of from 0.1 to 10% by weight of crude oil, though even higher amounts of asphaltenes may be found in heavy crude oils.

At high pressure, under reservoir conditions, asphaltenes are stable and thought to exist in equilibrium, either as individual molecules or as stable nano-aggregates suspended in the crude oil. However, when conditions change and equilibrium is disturbed, asphaltenes can precipitate and form larger aggregates by flocculation. Flocculation is the point at which precipitated asphaltenes start to grow in size and become unstable.

Deposition occurs when the flocculated asphaltenes are no longer carried with the flow of crude oil and form deposits that adhere to well tubing and pipelines downstream of the wellhead. Deposits from a production well may contain about 70% by weight asphaltene, as well as resins, aromatics and alkanes in smaller amounts.

Asphaltene deposition is a major concern in upstream oil production, transportation pipelines and downstream processing because it can lead to e.g. plugging of wellbores and flow-lines, reservoir impairment, emulsion formation, pump failure and heat exchanger fouling. Thus, asphaltene deposition causes significant operational and economic consequences.

In order to avoid costly well workovers, lost production, and high maintenance cycles, field operators generally employ both mechanical means to remove precipitated asphaltene, and chemical means to prevent asphaltene precipitation and/or deposition occurring in the first place.

Mechanical control of asphaltene-deposition is generally carried out using cleaning pigs. Deposits which are removed from a pipeline using a cleaning pig are known as 'pigged deposits'.

Chemical control of asphaltene deposition is generally carried out by injecting ppm levels of an asphaltene stabilizer. Asphaltene stabilizers include inhibitors, which slow or prevent the initial precipitation of asphaltene molecules from solution, and dispersants, which slow or prevent the flocculation of precipitated asphaltene molecules into larger particles. Asphaltene stabilizers can be identified in a number of different ways. In some methods, asphaltene stabilizers may be identified and tested by separating precipitated asphaltene from a crude oil, and using the precipitated asphaltene to test asphaltene stabilizers.

For example, US 2011/162558 discloses a method in which a sample of precipitated asphaltene is added to hexane and a dispersant formulation and subjected to agitation in an ultrasound bath. After 6 hours, the amount of precipitated asphaltene is measured and compared with a reference sample to determine the efficiency of the dispersant formulation.

In U.S. Pat. No. 8,177,960, asphaltenic components are separated from a hydrocarbon medium by precipitation with n-heptane. These components are then dissolved in toluene. Asphaltene-stabilizing molecules are added to the solution. An asphaltene precipitant, n-hexane, is added to the samples which are observed over 24 hours for signs of precipitation. The experiments are repeated to determine the amount of asphaltene-stabilizing molecules necessary to keep the asphaltenes in solution.

However, by carrying out these experiments in solvents and by using asphaltene which has been precipitated from a hydrocarbon fluid in the laboratory, results may be obtained which are not reflective of the performance of an asphaltene stabilizer in e.g. a crude oil that is present in a production, transportation or processing pipeline.

In other methods, asphaltene stabilizers are often selected based on laboratory screening methods in which a stock tank oil (also known as "dead oil" or "raw crude") is used. This is because it is very expensive to obtain live oil and to conduct screening methods using live oil.

For example, Oskui et al in "Laboratory Technique for Screening Asphaltene Inhibitors for Kuwaiti Reservoirs", SPE 106361 (2006) disclose a method in which the effect of different asphaltene inhibitors was analysed by titrating n-heptane against samples of stock tank oil to which the inhibitors had been added.

However, since stock tank oil may not contain the most problematic asphaltenes, e.g. because they were deposited during oil production and/or deposited as sludge in the stock tank, the use of stock tank oils in methods for screening asphaltene stabilizers may lead to erroneous or inconclusive results.

Accordingly, there is a need for a more accurate method for screening candidates for their efficacy as asphaltene stabilizers.

SUMMARY OF THE INVENTION

The present invention provides a method for screening a candidate for efficacy as an asphaltene stabilizer, said method comprising:

forming a reconstituted oil by dispersing an asphaltene-containing solid in a hydrocarbon fluid;

adding an asphaltene stabilizer candidate to the reconstituted oil to give an additized oil; and analyzing the stability of the asphaltenes in the additized oil.

By using a reconstituted oil, rather than a stock tank oil, it is believed that more accurate screening of asphaltene stabilizer candidates may be achieved. Thus, the most effective candidates for inhibiting the precipitation, flocculation and/or deposition of asphaltene may be identified.

Accordingly, the present invention further provides a method for preventing the precipitation of asphaltenes, wherein the method comprises:

screening a plurality of candidates for efficacy as asphaltene stabilizers using a method disclosed herein;

selecting a candidate based on a comparison of the efficacies of the plurality of candidates; and adding the selected candidate to a hydrocarbon fluid to prevent the precipitation of asphaltenes.

Also provided is the use of a reconstituted oil for screening a candidate for efficacy as an asphaltene stabilizer, where said reconstituted oil is obtainable by a method in which an asphaltene-containing solid is dispersed in a hydrocarbon fluid

DETAILED DESCRIPTION OF THE INVENTION

Figure 1:
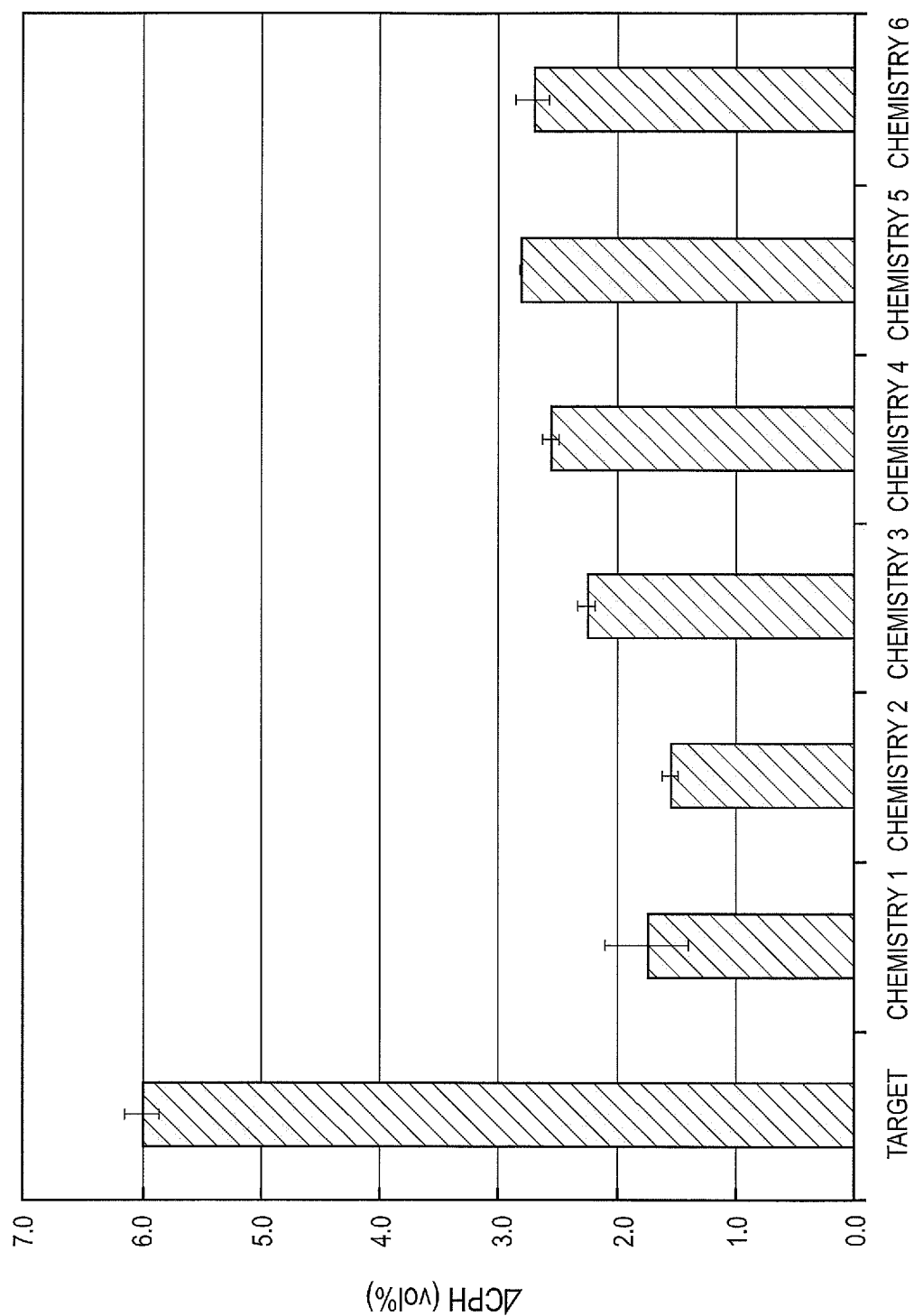
FIG. 1 shows results obtained from experiments according to the present invention, in which heptane was titrated against a reconstituted oil containing different asphaltene stabilizer candidates.

The method of the present invention involves forming a reconstituted oil by dispersing an asphaltene-containing solid in a hydrocarbon fluid. An asphaltene stabilizer candidate is added to the reconstituted oil, and the stability of asphaltenes in the resulting additized oil analysed. It is believed that the use of a reconstituted oil, rather than stock tank oil, improves the accuracy of the screening method.

The asphaltene-containing solid may comprise asphaltenes in an amount of at least 30% by weight, preferably at least 50% by weight, and more preferably at least 65% by weight of the solid. Asphaltenes are preferably present in the asphaltene-containing solid in an amount of from 30 to 90% by weight, and more preferably in an amount of from 65 to 85% by weight of the solid. The asphaltene content of the solid may be measured according to ASTM D2007-11.

Aside from asphaltene, the asphaltene-containing solid may comprise other components that are typically present in deposits that form during the production, transportation or processing of hydrocarbons. For instance, the asphaltene-containing solid may comprise one or more of saturates (i.e. alkanes), aromatic compounds and resins.

Saturates are preferably present in the asphaltene-containing solid in an amount of from 5 to 40% by weight, and more preferably in an amount of from 8 to 25% by weight of the solid. The content of saturates in the asphaltene-containing solid may be measured according to ASTM D2007-11.

Aromatics are preferably present in the asphaltene-containing solid in an amount of from 3 to 20% by weight, and more preferably in an amount of from 5 to 15% by weight of the solid. The content of aromatics in the asphaltene-containing solid may be measured according to ASTM D2007-11.

Resins are preferably present in the asphaltene-containing solid in an amount of from 0.5 to 10% by weight, and more preferably in an amount of from 1 to 5% by weight of the solid. The content of resins in the asphaltene-containing solid may be measured according to ASTM D2007-11.

In an embodiment, the asphaltene-containing solid comprises asphaltenes in an amount of from 30 to 90% by weight, saturates in an amount of from 5 to 40% by weight, aromatics in an amount of from 3 to 20% by weight, and resins in an amount of from 0.5 to 10% by weight of the solid. In a particular embodiment, the asphaltene-containing solid comprises asphaltenes in an amount of from 65 to 85% by weight, saturates in an amount of from 8 to 25% by weight, aromatics in an amount of from 5 to 15% by weight, and resins in an amount of from 1 to 5% by weight of the solid.

Other components that may be present in the asphaltene-containing solid include inorganic solids such as iron oxide, iron sulphides and clays.

The asphaltene-containing solid may be a solid that has precipitated from a crude oil, preferably during production (i.e. extraction of the live oil from a subterranean formation), transportation (i.e. flow lines) or processing (i.e. crude oil refining), The components in these deposits may be considered to contain the most "problematic" asphaltenes in the environment from which the deposit was taken, since they are the components that have precipitated, flocculated and deposited on the interior surfaces of the pipes when changes to the conditions in the pipeline occur during crude oil production, transportation and processing. Changes to the conditions in the pipeline include, among other things, changes in pressure, temperature or chemical composition. In contrast, samples that are precipitated in a laboratory may not contain the most problematic asphaltenes, since the most problematic asphaltenes would generally have already precipitated as part of the production, transportation and/or processing of the laboratory sample.

In preferred embodiments, the asphaltene-containing solid is a pigged deposit, i.e. a deposit that has been obtained by cutting an asphaltene-containing deposit from a pipeline using a cleaning pig. Asphaltene-containing deposits tend to build up on the surface of pipelines, and so the deposits will usually be cut from these locations.

In embodiments, the asphaltene-containing solid is selected based on the location in which the asphaltene stabilizer candidate is intended for use. Where the method of the present invention is used to test the efficacy of an asphaltene stabilizer for a specific location, the asphaltene-containing solid may be a solid that has precipitated from a crude oil under conditions which are representative of those found in the specific location. For example, where the method is used to test the efficacy of a plurality of asphaltene stabilizers for use in crude oil production, transportation or processing, the asphaltene-containing solid is preferably a solid that has precipitated during production, transportation or processing of a crude oil, respectively.

The asphaltene-containing solid is preferably used in the form of a powder. In an embodiment, the powder has an average diameter of less than 10 preferably less than 5 μm and more preferably less than 1 μm. The diameter may be measured as the median average diameter (i.e. D50) e.g. using laser diffraction e.g. according to ISO 13320:2009. It has been observed that asphaltene-containing solids in the form of a powder having these particle sizes exhibit good dispersion in the hydrocarbon fluid.

Thus, in embodiments, methods of the present invention comprise grinding an asphaltene-containing solid to form a powder. Any method may be used to reduce the size of the asphaltene-containing solid, such as by grinding with a high shear mixer or a ball mill.

The asphaltene-containing solid, e.g. in the form of a powder, is redispersed in a hydrocarbon fluid to form a reconstituted oil.

The hydrocarbon fluid is preferably a stock tank oil (i.e. a dead oil or raw crude). A stock tank oil may be obtained by bringing crude oil from a subterranean formation (i.e. a live oil) to atmospheric conditions, for instance of 20° C. and 100 kPa. Gases that are dissolved in the live oil under subterranean conditions are removed during this process.

It will be appreciated that the accuracy of the screening method will be improved if the hydrocarbon fluid is free from any asphaltene stabilizers. The hydrocarbon fluid is preferably also free from any other stabilizers, e.g. dispersants. That said, in some instances, it may be useful to screen an asphaltene stabilizer for efficacy and compatibility with other components that may be used in hydrocarbon fluid production, transportation and/or processing.

The hydrocarbon fluid is preferably free from drilling mud, and any other contaminants. The presence of any pre-existing solids in the hydrocarbon fluid may interfere with dispersion of the asphaltene-containing solid and therefore screening of the asphaltene stabilizers. Pre-existing solids may also make it difficult to determine when asphaltene-precipitation occurs during the screening methods. Thus, in some embodiments, the methods of the invention comprise the step of removing any solids from the hydrocarbon fluid before the asphaltene-containing solid is dispersed therein. This is preferably achieved using centrifugation, though simple filtration may also be used.

The reconstituted oil may be formed by dispersing the asphaltene-containing solid in the hydrocarbon fluid in an amount of from 0.05 to 8% by weight, preferably from 0.1 to 5% by weight, and more preferably from 0.5 to 3% by weight of the hydrocarbon fluid. As mentioned below, it is possible that only a portion of the asphaltene-containing solid will disperse in the hydrocarbon fluid.

The asphaltene-containing solid is preferably mixed with the hydrocarbon fluid. This is to encourage dispersion of the asphaltene-containing solid in the hydrocarbon fluid. A vortex mixer may be used to disperse the asphaltene-containing solid in the hydrocarbon fluid.

Sonication may also be used to disperse the asphaltene-containing solid in the hydrocarbon fluid. Sonication helps to breakdown and disperse the asphaltene-containing solid, particularly where larger particles are present. A bath sonication or a high power probe sonication may be used.

In embodiments, the asphaltene-containing solid may be mixed with the hydrocarbon fluid, e.g. using a vortex mixer, and sonication applied to the resulting mixture, e.g. bath sonication (e.g. for about an hour) followed by high power probe sonication (e.g. for about 3 minutes).

The reconstituted oil may then be additized with an asphaltene stabilizer candidate.

However, in a preferred embodiment, any undispersed asphaltene-containing solid is removed from the reconstituted oil before it is additized. The undispersed asphaltene-containing solid is preferably removed from the reconstituted oil using centrifugation, particularly when it is in the form of a fine powder, though other methods may also be used. The removed asphaltene-containing solids may be weighed, e.g. after washing (preferably with an asphaltene precipitant) and drying, to determine the amount of asphaltene-containing deposit that is dispersed in the reconstituted oil.

The reconstituted oil is additized with an asphaltene stabilizer candidate.

The term asphaltene stabilizer is used herein to denote chemistries that maintain asphaltenes in a dissolved or dispersed state in a fluid, e.g. by inhibiting (e.g. preventing or slowing) the precipitation, flocculation and/or deposition of asphaltene in a fluid. The asphaltene stabilizer may be an asphaltene inhibitor or an asphaltene dispersant.

Methods of the present invention may be used to screen a candidate to determine whether it exhibits activity as an asphaltene stabilizer. For example, a candidate that has been proposed for use as an asphaltene stabilizer, but it is not yet known to exhibit activity as an asphaltene stabilizer, may be screened. Whether a candidate exhibits any activity as an asphaltene stabilizer may be determined by comparing the stability of the asphaltenes in the additized oil to those in the reconstituted oil.

Methods of the present invention may also be used to screen a candidate to determine its degree of efficacy as an asphaltene stabilizer. For example, a candidate may be screened to determine whether it is a weak, moderate or strong asphaltene stabilizer. In some embodiments, a candidate that is known to exhibit activity as an asphaltene stabilizer may be screened. The degree of efficacy of the candidate as an asphaltene stabilizer may be determined by comparing the stability of the asphaltenes in the additized oil with those of the reconstituted oil, or with those in reconstituted oils that have been additized with other chemistries such as asphaltene stabilizers having a known degree of efficacy.

The asphaltene stabilizer candidate may be a compound or a composition (i.e. a mixture of compounds). The candidate will generally be a solid that is soluble in a hydrocarbon fluid or a liquid. As mentioned above, the candidate may be a known asphaltene stabilizer, or it may be a candidate that has been proposed for use as an asphaltene stabilizer.

Candidates may be screened for their efficacy as asphaltene stabilizers for a particular purpose, e.g. for efficacy as an asphaltene stabilizer in crude oil production, transportation or processing pipelines. In these embodiments, the asphaltene-containing solid is preferably obtained from a pipeline having the same purpose.

The asphaltene stabiliser candidate may be added to the reference oil in an amount of from 0.001 to 0.5%, preferably in an amount of from 0.005 to 0.2%, and more preferably in an amount of from 0.01 to 0.1% by weight of the reference oil.

The additized oil may be stirred to ensure that the asphaltene stabiliser candidate and the reference oil are well mixed.

The stability of the asphaltenes in the additized oil may be analysed using a wide range of methods. Suitable methods include methods based on optical microscopy, automatic titrimetry, turbidimetry, nephleometry, focused beam laser reflectance measurements, refractive index measurements, particle size measurements, coupon deposition methods, RealView (Schlumberger), quartz crystal microbalance (QCM), capillary loop deposition, and on column precipitation.

Suitable analysis methods may involve the step of adding the asphaltene stabilizer candidate to the reconstituted oil, and inducing asphaltene precipitation in the reconstituted oil. The extent to which asphaltene precipitation must be induced may be used as a measure of efficacy.

Preferred analysis methods include the step of adding an asphaltene precipitant to the reconstituted oil, before or after it has been additized. The asphaltene precipitant may be an alkane, preferably a $C_{4-20}$ alkane, and more preferably a $C_{4-20}$ n-alkane or a $C_{4-20}$ iso alkane. Suitable asphaltene precipitants include heptane, undecane and pentadecane, with n-heptane preferably used.

The asphaltene precipitant will generally be added to the reconstituted oil once it has been additized (i.e. the additized oil), though it may e.g. also be added by combining the asphaltene precipitant with the asphaltene stabilizer candidate, and subsequently adding both the candidate and the asphaltene precipitant to the reconstituted oil.

In some embodiments, the asphaltene precipitant may be added to the reconstituted oil before it has been additized in order to induce asphaltene precipitation. The asphaltene stabilizer candidate may then be added to the reconstituted oil to determine whether it is capable of re-dispersing the precipitated asphaltene.

However, in preferred embodiments, the analysis method comprises titrating the asphaltene precipitant against the additized oil, in order to determine the amount of asphaltene precipitant that may be added before precipitation is observed. The greater the amount of asphaltene precipitant that can be added before precipitation is observed, the higher the degree of efficacy of the candidate as an asphaltene stabilizer.

Titration intervals of less than 15% by volume, preferably less than 10% by volume, and more preferably less than 5% by volume of the reconstituted oil may be used.

The additized oil and the asphaltene stabilizer candidate are preferably mixed during titration, e.g. using a stirrer.

The additized oil and the asphaltene stabilizer candidate may be left to equilibrate at each titration interval, e.g. for a period of at least 1 minute, preferably at least 5 minutes, and more preferably at least 10 minutes.

The additized oil and the asphaltene stabilizer candidate may be observed under an optical microscope to determine when asphaltene precipitation occurs. Alternatively, they may be subjected to centrifugation, with any solids washed (e.g. using the asphaltene precipitant) and weighed to determine the amount of asphaltene precipitation.

In some embodiments, the analysis method may be carried out using automatic flocculation titrimetry.

Methods of the present invention may be used to screen a plurality of candidates for efficacy as asphaltene stabilizers. In these embodiments, each candidate is screened for efficacy as an asphaltene stabilizer.

Methods in which a plurality of candidates is screened may form part of a method for preventing the precipitation of asphaltenes. Once the plurality of candidates has been screened, a candidate may be selected based on a comparison of the efficacies of the plurality of candidates.

A candidate may be selected because it has been shown to be the most effective as an asphaltene stabilizer, although factors may be taken into account as well as efficacy, such as the cost of the candidate.

The selected candidate may then be used as an asphaltene stabilizer. For instance, the selected candidate may be added to a hydrocarbon fluid to prevent the precipitation of asphaltenes. In an embodiment, the selected candidate is added to a hydrocarbon fluid which is present in a production, transportation or processing pipeline.

The selected candidate may be added to any hydrocarbon fluid which is prone to asphaltene precipitation. For instance, the selected candidate may usefully be added to a crude oil.

The invention will now be described with reference to the accompanying non-limiting figures and examples.

EXAMPLES

Example 1: Preparation of a Reconstituted Oil

A pigged deposit was obtained from a live oil flow line. The pigged deposit had the following composition (by weight of the deposit, measured according to ASTM D2007-11):

| | |
|---|---|
| Saturates | 15.4% |
| Aromatics | 9.7% |
| Resins | 2.9% |
| Asphaltenes | 72% |

0.1% by weight of the pigged deposit was soluble in cyclohexane. 48.5% by weight of the pigged deposit was soluble in toluene. 23.5% by weight of the pigged deposit was soluble in a mixture of dichloromethane and methanol.

The pigged deposit was ground into a fine powder having a diameter of less than 1 μm using a high shear mixer.

A stock tank oil was centrifuged to remove any solids that were present therein.

The powdered deposit was added to the filtered stock tank oil in an amount of about 1% by weight. A vortex mixture was used to disperse the powdered deposit in the stock tank oil. A bath sonicator was then used for about an hour, followed by a high power probe sonicator for about 3 minutes, to further disperse the powdered deposit and breakdown any larger particles.

Any residual, solids were removed from the resulting reconstituted oil by centrifuge. The undissolved portion of the pigged deposit was washed, dried and weighed to determine the weight percent of the deposit that was dispersed in the hydrocarbon fluid.

Example 2: Screening Asphaltene Inhibitors Using the Reconstituted Oil

Six different commercially available asphaltene inhibitor candidates were added to portions of the reconstituted oil in an amount of 0.5% by weight of the oil.

Experiments were conducted in which heptane was titrated against each of the portions of additized oil. An experiment was also conducted in which heptane was titrated against the reconstituted oil.

The results of the experiments are shown in FIG. 1. ACPH represents the change in the amount of heptane that was added to the different additized oils before precipitation was observed (i.e. the critical percentage of heptane) as compared to the reconstituted oil.

Figure 2:
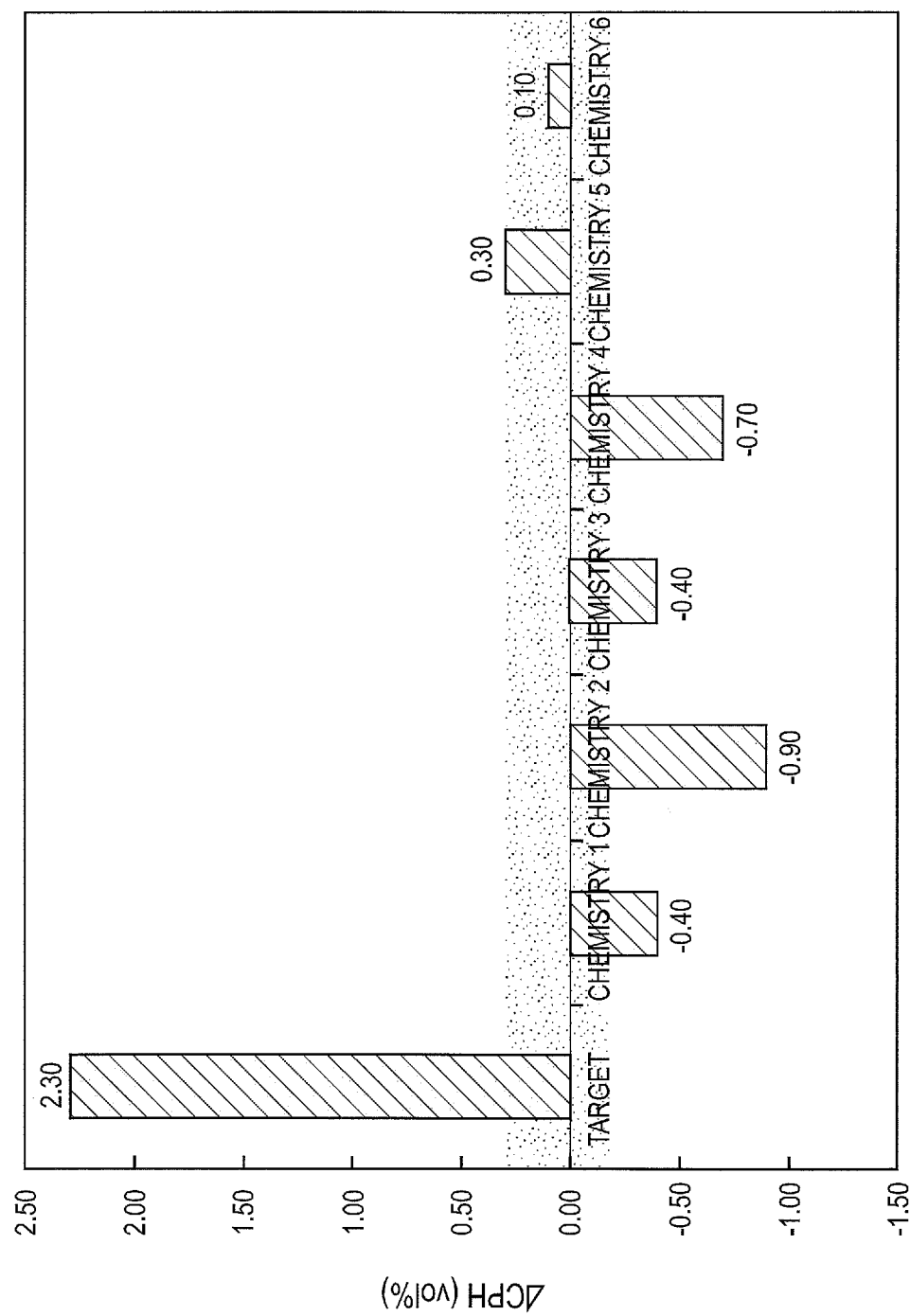
FIG. 2 shows results obtained from reference experiments in which heptane was titrated against a stock tank oil containing different asphaltene stabilizer candidates.

For comparison, the experiments were repeated using stock tank oil, rather than reconstituted oil. The results are shown in FIG. 2.

It can be seen that the results of the experiments that were conducted using stock tank oil were inconclusive, whereas the results that were obtained using the reconstituted oil provide useful information on the efficacy of the different candidates as asphaltene inhibitors.

The invention claimed is:

1. A method for screening a candidate for efficacy as an asphaltene stabilizer, said method comprising:
   forming a reconstituted oil by dispersing a recovered asphaltene-containing solid in a hydrocarbon fluid;
   adding an asphaltene stabilizer candidate to the reconstituted oil to give an additized oil; and
   analyzing the stability of the asphaltenes in the additized oil.

2. The method of claim 1, wherein the asphaltene-containing solid comprises asphaltenes in an amount of at least 40% by weight.

3. The method of claim 1, wherein the asphaltene-containing solid comprises one or more of saturates, aromatic compounds and resins.

4. The method of claim 3, wherein the asphaltene-containing solid comprises asphaltenes in an amount of from 30 to 90% by weight, saturates in an amount of from 5 to 40% by weight, aromatics in an amount of from 3 to 20% by weight, and resins in an amount of from 0.5 to 10% by weight of the solid.

5. The method of claim 1, wherein the asphaltene-containing solid is a solid that has precipitated from a crude oil.

6. The method of claim 5, wherein the asphaltene-containing solid is a pigged deposit.

7. The method of claim 1, wherein the asphaltene-containing solid is in the form of a powder.

8. The method of claim 1, wherein the hydrocarbon fluid is a stock tank oil.

9. The method of claim 1, wherein the method comprises removing any solids from the hydrocarbon fluid before the asphaltene-containing solid is dispersed therein.

10. The method of claim 1, wherein the asphaltene-containing solid is dispersed in the hydrocarbon fluid in an amount of from 0.05 to 8% by weight.

11. The method of claim 1, wherein undispersed asphaltene-containing solid is removed from the reconstituted oil before the reconstituted oil is additized.

12. The method of claim 1, wherein the candidate is a compound or a composition.

13. The method of claim 1, wherein the method comprises screening a candidate for its efficacy as an asphaltene stabilizer for a particular purpose, and the asphaltene-containing solid is a solid which has been obtained from a pipeline having the same purpose.

14. The method of claim 13, wherein the candidate is screened for its efficacy as an asphaltene stabilizer in crude oil production, transportation or processing pipelines.

15. The method of claim 1, wherein the asphaltene stabilizer candidate is added to the reconstituted oil in an amount of from 0.001 to 0.5%.

16. The method of claim 1, wherein analyzing the stability of the asphaltenes in the additized oil includes the step of adding an asphaltene precipitant to the additized oil.

17. The method of claim 16, wherein the asphaltene precipitant is titrated against the additized oil, in order to determine the amount of asphaltene precipitant that may be added before asphaltene precipitation is observed.

18. The method of claim 1, wherein the method comprises screening a plurality of candidates for efficacy as asphaltene stabilizers.

19. A method for preventing the precipitation of asphaltenes, wherein the method comprises:
 screening a plurality of candidates for efficacy as asphaltene stabilizers using the method of claim 18;
 selecting a candidate based on a comparison of the efficacies of the plurality of candidates; and
 adding the selected candidate to a hydrocarbon fluid to prevent the precipitation of asphaltenes.

20. The method of claim 19, wherein the selected candidate is added to a hydrocarbon fluid which is present in a production, transportation or processing pipeline.

21. The method of claim 19, wherein the selected candidate is added to a crude oil.

* * * * *